(12) United States Patent
Pence

(10) Patent No.: US 6,199,146 B1
(45) Date of Patent: Mar. 6, 2001

(54) STORAGE MANAGEMENT SYSTEM AND METHOD FOR INCREASING CAPACITY UTILIZATION OF NONVOLATILE STORAGE DEVICES USING PARTIALLY FILLED SUBSTITUTE STORAGE DEVICES FOR CONTINUING WRITE OPERATIONS

(75) Inventor: Jerry Wayne Pence, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/041,257

(22) Filed: Mar. 12, 1998

(51) Int. Cl.[7] .............................. G06F 12/00; G06F 13/00

(52) U.S. Cl. .............................. 711/154; 711/4; 711/112; 711/161; 711/162; 711/165; 711/170

(58) Field of Search .............................. 711/4, 112, 114, 711/161, 162, 165, 154, 170; 714/6, 7, 5

(56) References Cited

U.S. PATENT DOCUMENTS

| | | | |
|---|---|---|---|
| 3,772,657 | 11/1973 | Marsalka et al. | 714/48 |
| 4,771,375 | * 9/1988 | Beglin et al. | 711/111 |
| 5,121,479 | 6/1992 | O'Brien | 710/34 |
| 5,345,584 | 9/1994 | Hill | 711/170 |
| 5,423,018 | 6/1995 | Dang et al. | 711/159 |
| 5,475,834 | * 12/1995 | Anglin et al. | 707/203 |
| 5,542,065 | * 7/1996 | Burkes et al. | 711/114 |
| 5,623,693 | 4/1997 | Ashton et al. | 710/5 |
| 5,717,884 | * 2/1998 | Gzym et al. | 711/206 |
| 5,875,481 | * 2/1999 | Ashton et al. | 711/165 |
| 5,881,311 | * 3/1999 | Woods | 710/4 |

OTHER PUBLICATIONS

IBM General Information, DFSMS/MVSV Version 1 Release 4, Chapter 12. DFSMShsm facilities (C) 1980, 1997.

* cited by examiner

Primary Examiner—Glenn Gossage
(74) Attorney, Agent, or Firm—David W. Victor; Konrad Raynes & Victor

(57) ABSTRACT

A system and method for increasing capacity utilization of non-volatile storage devices within a group of non-volatile storage devices used to store data from at least one attached system are disclosed. A group of data sets is written to a first storage device as part of a write operation such as migration. A plurality of storage devices partially filled with data are designated as substitutes. The write operation to the first storage device is suspended upon receiving a request to read a data set stored in the first storage device, such as occurs in a recall operation. A second storage device is then selected from the plurality of substitute storage devices. The write operation is continued by writing data sets from the group of data sets included in the write operation that were not written to the first storage device to the selected second storage device. The requested data is then read from the first storage device. After data has been read from the first storage device, the first storage device may be designated as a substitute storage device so that the partially filled first storage device may be selected for continuing write operations. Data sets from substitute storage devices may be transferred or merged into a lesser number of storage devices during recycle operations to prevent the number of substitute storage devices from increasing beyond a predetermined limit or goal. Recycling operations in which data sets from different storage devices are transferred or merged may be performed by building a first queue including a list of filled tapes ordered according to the least amount of valid data and a second queue including all unassociated partially filled storage devices ordered by the amount of available storage space, and merging. The non-volatile storage devices may include tapes or tape libraries.

23 Claims, 5 Drawing Sheets

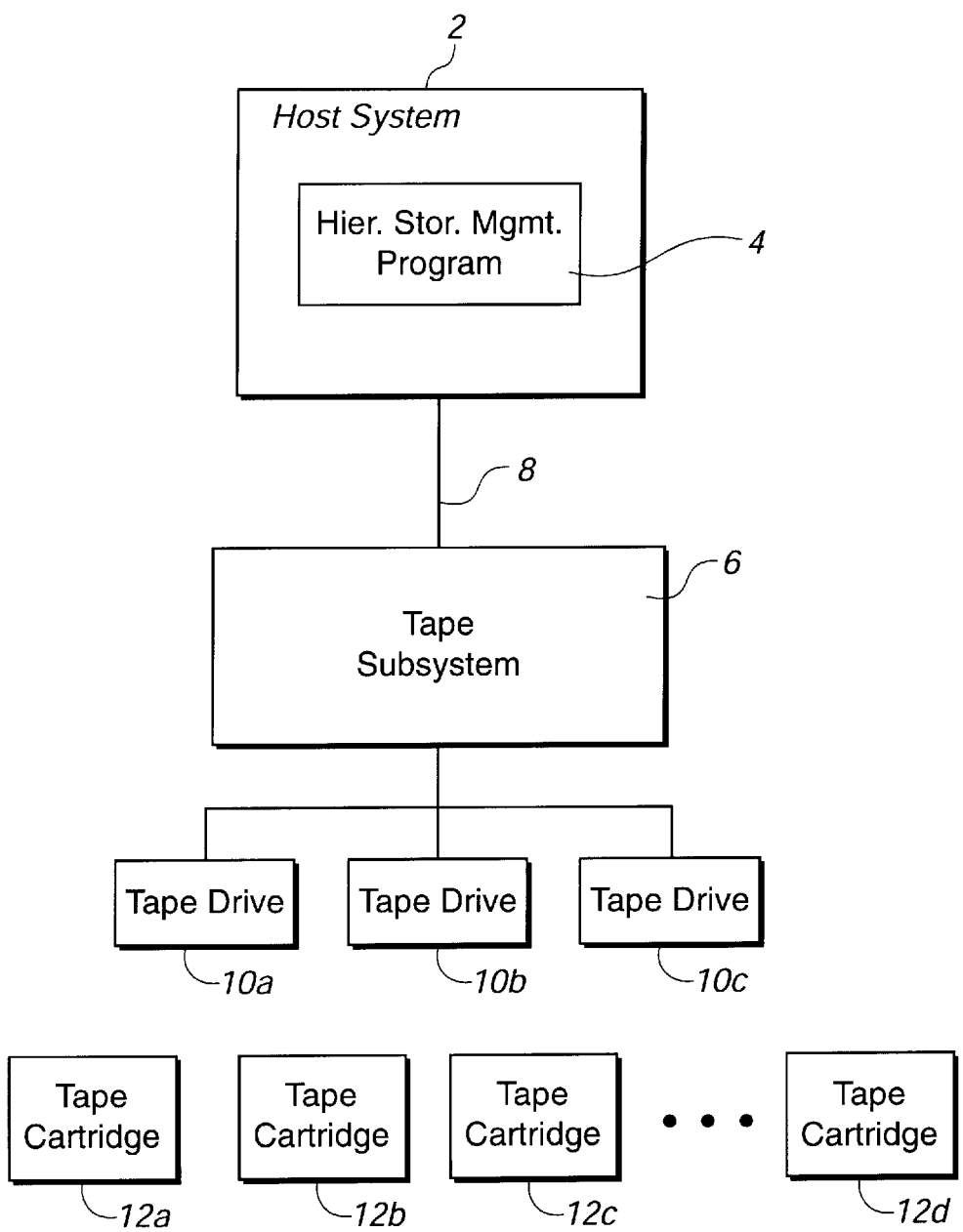

30

| Tape No. | Status |
|---|---|
| 12a | Recall |
| 12b | Migration |
| 12c | Unassociated |
| 12d | Unassociated |
| 12e | Recycle |

| Tape No. | Capacity |
|---|---|
| 12c | 30% |
| 12d | 70% |

Fig. 2b

STORAGE MANAGEMENT SYSTEM AND METHOD FOR INCREASING CAPACITY UTILIZATION OF NONVOLATILE STORAGE DEVICES USING PARTIALLY FILLED SUBSTITUTE STORAGE DEVICES FOR CONTINUING WRITE OPERATIONS

BACKGROUND OF THE INVENTION

1. Field of the Invention

The present invention relates to a system for improving capacity utilization of storage devices.

2. Description of the Related Art

An explosion of computer data and information, e.g., video, sound, pictures, etc., requires an ever increasing amount of computer readable storage space. Increasing data storage capacity requires improved storage management systems to backup and protect data sets, and migrate less active data sets to secondary storage to increase primary storage space. A data set consists of any collection or grouping of data. In certain systems, a data set may include control information used by the system to manage the data. The terms data set and file are generally equivalent and sometimes are used interchangeably. Hierarchical storage management (HSM) programs manage storage devices, such as tape libraries, to control the flow of data between primary and secondary storage facilities. Two important HSM procedures are migration and recall. The migration procedure transfers the least frequently used data sets from primary to secondary tape storage. If a user wants to access migrated data sets, then the recall procedure retrieves migrated data from the secondary storage, e.g., tape, to the primary storage device, such as a local hard drive or group of direct access storage devices (DASDs). Currently, magnetic tape is the preferred media for backups and secondary storage. In the future, optical and holographic storage devices may supplant magnetic tape.

Users often want data immediately. Such an immediate need for data creates a conflict if a user wants access to a data set that is located on a tape currently involved in a migration or backup operation. To provide immediate access to such tape, the HSM system would have to interrupt the migration to allow the user to recall the data set from the tape. Otherwise, the user would have to wait until migration completed. Wait times can be considerable given that current magnetic tapes can take several hours to fill entirely.

If the migration procedure is interrupted to allow the user to recall data, then the tape will be taken away from migration for read operations. As a result, the recalled tape is likely only partially filled with data. As tape size increases, so does the likelihood that a user will need to recall a data set on a tape involved in a migration procedure. Increasing the number of interruptions to migration operations to service recall requests increases the number of partially filled tapes as discussed below.

This tape capacity utilization problem is exaggerated because during migration/recall type operations, partially filled tapes cannot be used to complete a migration after a tape has been filled prior to completely migrating a data set. For instance, when a tape is filled in the middle of migrating a data set, only a blank tape can be used to store the remainder of the migrated data set. A partially filled tape includes no marker indicating empty portions of the tape. Thus, a data set cannot be completed in the middle of a partially filled tape because there is no marker to indicate where in the partially filled tape the remainder of the data set is placed. Using an empty tape to complete the migration of a data set creates another partially filled tape.

Tape data set stacking software seeks to improve tape capacity utilization. Some products involve hardware solutions to improve tape utilization, such as the International Business Machine (IBM) Corporation's Magstar Virtual Tape Server. The Virtual Tape Server employs a cache of DASD devices which appear as tape devices to the user. Data is backed up from the virtual tapes, i.e., the DASD devices, to the tape library in a manner that maximizes tape capacity utilization.

The IBM Data Facility Storage Management Subsystem (DFSMS) implemented in the IBM Multiple Virtual Storage (MVS) operating system provides two techniques for increasing tape capacity utilization. The Tape Mount Management (TMM) procedure of DFSMS involves routing data sets to a DASD pool, called the buffer. The DFSMS software checks the DASD pool and automatically migrates files from the DASD pool to tapes. DFSMS further includes a recycling operation. When a tape is taken away during a migration or recycle operation by a recall request, the tape is marked as full. Subsequently, the tapes marked as full are gathered and the data in the tapes is recycled into a smaller set of tapes. For instance, if two tapes marked as full are 10% and 25% occupied with data, the DFSMS program will merge the data contents from these tapes into a single tape that is 35% filled.

The recycling process takes tape resources off-line from normal HSM operations. At some point, at least two tape drives must be set aside to merge multiple input tapes into a single output tape. A table of tapes marked as full, containing both valid and invalid data sets, is built. Data sets are invalidated over time by the expiration or subsequent recall of migrated data. The valid data sets from the full tapes are then merged into an output tape. Those filled tapes containing the least amount of valid data are typically recycled first. Moreover, recycling operations take place at predetermined intervals. Between these recycle periods, numerous tapes could become partially filled, marked as filled, and set aside.

Relying on recycling to increase tape capacity utilization requires that tape drives be taken away from regular input/output (I/O) operations and dedicated to recycling operations. Further, additional processing power must be taken off-line to handle the recycling. Moreover, recycling does nothing to limit the continually expanding number of partially filled tapes not marked as full during normal operations.

SUMMARY OF THE PREFERRED EMBODIMENTS

To overcome the limitations in the prior art described above, the present invention discloses a system for increasing capacity utilization of non-volatile storage devices within a group of non-volatile storage devices used to store data from at least one attached system. A group of data sets is written to a first storage device as part of a write operation. A plurality of storage devices partially filled with data are designated as substitutes. The write operation to the first storage device is suspended upon receiving a request to read a data set stored in the first storage device. A second storage device is then selected from the plurality of substitute storage devices. The write operation is continued by writing data sets from the group of data sets included in the write operation that were not written to the first storage device to the selected second storage device. The requested data is then read from the first storage device.

In further embodiments, after data has been read from the first storage device, the first storage device is designated as a substitute storage device. In this way, the partially filled first storage device may be selected for continuing write operations.

In still further embodiments, the substitute storage devices can be used as input during recycling operations, wherein data sets from substitute storage devices are transferred to an output storage device. If an output storage device is needed to complete recycling operations, one of the substitute storage devices can be used as output in recycling operations to further improve data capacity utilization.

The preferred embodiments improve storage capacity utilization by using partially filled storage devices in write operations. This insures that partially filled storage devices will be filled with data writes. Moreover, when a storage device is subject to a read request, such as a recall, writing to the storage device is suspended. This recalled storage device is partially filled with data because the write operation was likely suspended before the storage device was filled. After data has been read from the recalled storage device, the storage device is designated as a substitute which may then be used to complete other write operations suspended for recall. In this way, unused data storage capacity in substitute storage devices is utilized, thereby improving the capacity utilization of such storage devices.

Yet further, the substitute tapes can be used as input during recycling operations to further increase capacity utilization. Still further, substitute tapes can be used as recycling output to which input data sets are transferred. This also increases the capacity utilization of substitute tapes.

Thus, the preferred embodiments improve data capacity utilization by using partially filled substitute tapes in migration and/or recycling operations to add more data sets to the partially filled substitute tapes, thereby improving the capacity utilization of partially filled tapes.

BRIEF DESCRIPTION OF THE DRAWINGS

Referring now to the drawings in which like reference numbers represent corresponding parts throughout:

FIG. 1 is a block diagram illustrating a software and hardware environment in which preferred embodiments of the present invention are implemented;

FIG. 2a is a block diagram illustrating a data structure of a tape inventory table including information on available tape cartridges in accordance with preferred embodiments of the present invention;

FIG. 2b is a block diagram illustrating a data structure of a substitute tape table including information on those storage devices available for substitute operations in accordance with preferred embodiments of the present invention;

DETAILED DESCRIPTION OF THE PREFERRED EMBODIMENTS

Figure 3:
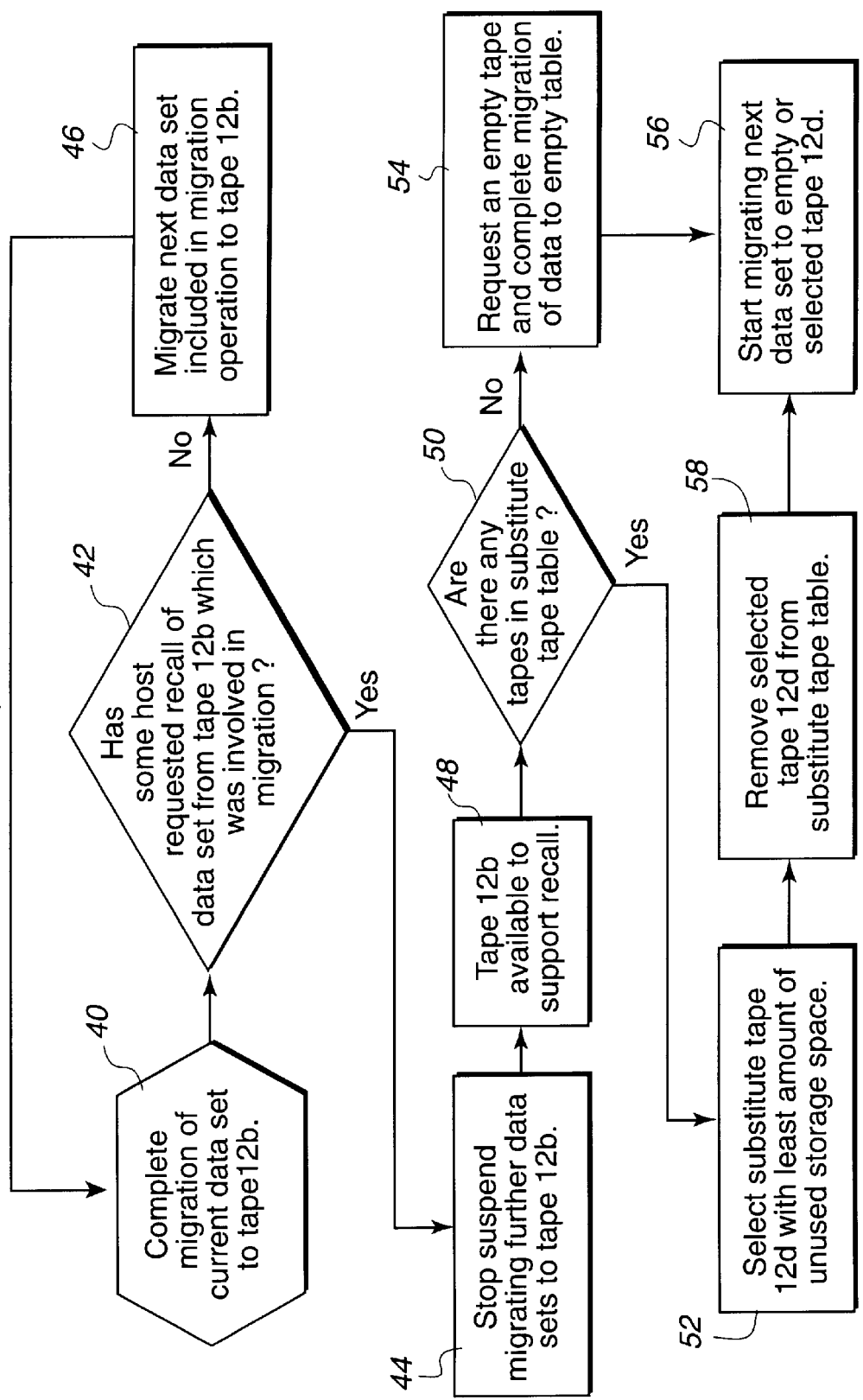
FIG. 3 illustrates a flowchart of logic that uses substitute tapes with migration operations in accordance with preferred embodiments of the present invention.

In the following description, reference is made to the accompanying drawings which form a part hereof, and which show by way of illustration, several embodiments of the present invention. It is understood that other embodiments may be utilized and structural changes may be made without departing from the scope of the present invention.

Hardware and Software Environment

FIG. 1 illustrates the hardware and software environment in which preferred embodiments of the present invention are implemented. A host system 2 includes a hierarchical storage management (HSM) program 4. Data is transferred between the host system 2 and secondary storage devices managed by a tape subsystem 6 via a network line 8. The network line 8 may be comprised of any network technology known in the art, such as Local Area Network (LAN), Wide Area Network (WAN), Storage Area Network (SAN), Transmission Control Protocol/Internet Protocol (TCP/IP), the Internet, etc. The tape subsystem 6 includes tape drives 10a, b, c. Tape cartridges 12a, b, c, d may be inserted in the tape drive and accessed by the tape subsystem 6. The tape subsystem 6 further includes program logic to manage the tape drives 10a, b, c and the tape cartridges 12a, b, c, d. In alternative embodiments, the tape subsystem 6 and host system 2 may be located on a single computer machine.

The host system 2 may be any computer system, such as a mainframe, personal computer, workstation, etc., including an operating system such as Windows, AIX, Unix, MVS, etc. (Windows is a registered trademark of Microsoft Corporation; AIX is a registered trademark and MVS is a trademark if IBM Corporation; and UNIX is a registered trademark in the United States and other countries licensed exclusively through The Open Group.) The HSM program 4 in the host system 2 may include the functionality of HSM type programs known in the art that manage the transfer of data to a tape library, such as the IBM DFSMS implemented in the IBM MVS operating system. The IBM DFSMS software is described in "DFSMS/MVS V1R4 General Information," IBM document no. GC26-4900-05, published by IBM (Copyright 1997, IBM), which publication is incorporated herein by reference in its entirety. In addition to including known HSM functions, such as recall and migration, the HSM program 4 would further include additional program instructions to perform the operations of the preferred embodiments of the present invention. The HSM program 4 may be implemented within the operating system of the host system 2 or as a separate, installed application program.

The tape subsystem 6 is similarly comprised of a computer system and manages a plurality of tape drives 10a, b, c and tape cartridges 12a, b, c, d. The tape drives 10a, b, c may be any suitable tape drives known in the art, e.g., the Magstar 3590 tape drives. Tape cartridges 12a, b, c, d may be any suitable tape cartridge device known in the art, (Magstar is a registered trademark of IBM Corporation) such as ECCST, Magstar, IBM 3420, 3480, 3490E, 3590 tape cartridges, etc. The tape subsystem 6 may be a manual tape library in which the user must manually mount tape cartridges 12a, b, c, d into the tape drives 10a, b, c or an automated tape library (ATL) in which a robotic arm mounts tape cartridges 12a, b, c, d in the library into the tape drives 10a, b, c. More or less tape drives and/or tape cartridges may be provided with the tape subsystem 6 than shown in FIG. 1.

In alternative embodiments, alternative storage media may be substituted for the tape cartridges 12a, b, c, d discussed above. Any type of non-volatile storage media could be used, including optical disks, holographic units, digital video disc (DVD), compact disc-read only memory (CD-ROM), non-volatile random access memory (RAM), etc.

The tape subsystem 6 receives commands from the HSM program 4 in the host system 2 and performs the operations requested by the HSM program 4, such as migration and recall, to transfer data between the host system 2 and the components managed by the tape subsystem 6. In preferred embodiments, the tape subsystem 6 can simultaneously process numerous input/output requests from the host system 2 and any other attached system directed toward the tape drives 10a, b, c and tape cartridges 12a, b, c, d managed by the tape subsystem 6. Moreover, the HSM program 4 in the host system 2 may be capable of multi-tasking, simultaneously executing numerous input/output operations, and simultaneously transmitting multiple I/O requests to the tape subsystem 6 to execute.

In further embodiments, a plurality of host systems 2 may communicate with the tape subsystem 6 and/or a host system 2 may communicate and transfer data to a plurality of tape subsystems 6, each subsystem providing access to a library of tape cartridges.

Managing Storage Devices to Improve Capacity Utilization

In preferred embodiments, to the extent possible, data sets are written to, i.e., stacked, on the same tape cartridge 12a, b, c, d or group of tape cartridges. This increases the efficiency of tape media usage and reduces the overall number of tape cartridges 12a, b, c, d needed. Stacking on the same tape cartridge 12a, b, c, d further installs a group of related data sets together on a minimum number of tape cartridges 12a, b, c, d. A data set collection is a group of data sets which are intended to be allocated on the same tape cartridge 12a, b, c, d as a result of data set stacking.

In preferred embodiments, the HSM program 4 manages at least two tables, illustrated in FIGS. 2a and 2b that are maintained in the host system 2 memory. FIG. 2a shows a tape inventory table 30 including information on all the tape cartridges 12a, b, c, d, e managed by the tape subsystem 6. As discussed, more tape cartridges, e.g., 12e, may be provided than shown in FIG. 1. The "Tape No." identifies the tape and its location in the tape subsystem 6, i.e., where it is located in the library. The "Status" information indicates the tape cartridges status, i.e., involved in migration, recall or recycling operations. Indication of an "unassociated" status signifies that the tape is not involved in a current operation. A tape 12b associated with migration is involved in a migration operation, a tape 12a associated with recall is the subject of a recall request, and a tape 12e associated with recycle is associated with recycling operations.

FIG. 2b shows a substitute tape table 32 indicating those tapes available as substitutes. The substitute tape table 32 further provides the amount of free storage space available on the substitute tape cartridges 12c, d. The HSM program 4 may readily access the substitute tape table 32 to determine which tape to substitute for a tape associated with a migration or recycling activity taken away to handle a recall operation.

The HSM program 4 processes the information in the substitute tape table 32 to select a tape to substitute for a tape taken away for a recall operation. If a recall request is made to a tape involved in migration or recycling, a record will indicate such recall request. After a complete data set has been transferred during migration or recycling to the tape, the transfer of further data sets will be suspended and the recalled tape will be taken away for the recall request. The selected substitute tape 12d will then take the place of the recalled tape such that the transfer of data sets will continue on the substitute tape. The HSM program 4 updates the tape inventory table 30 with the current status of tapes. The HSM program 4 may select a tape from the substitute tape table 32 based on a predefined criteria, such as substitute tape 12d having the least amount of available storage space.

A tape that was involved in a migration or recycling operation that was subject to an interrupting recall request will sometimes be partially full. After the recall request is completed, the partially filled tape is then given the "substitute" status. Substitute tapes are selected to complete the transfer of data sets involved in a migration or recycling operation for those tapes recalled and taken away from the migration or recycling operation.

To prevent the number of substitute tapes from increasing beyond a predetermined limit, the data sets from substitute tapes may be recycled into a lesser number of tapes. In preferred embodiments, recycle operations will occur at predetermined intervals. The HSM program 4 may maintain a substitute goal, which may be defined by the user or a default setting. To perform the recycle operation, the HSM program 4 builds two recycle queues using the tape inventory table 30. The first queue includes a list of all filled tapes ordered according to the least amount of valid data. The second queue includes all unassociated, partially filled tapes, which are also the substitute tapes, ordered by the amount of available space. The HSM program 4 then discards the goal number, e.g., 10, of substitute tapes most filled with data from the second queue. The HSM program 4 then merges the first and second queues into an input list and orders the tapes according to the least amount of valid data. The first recycle queue typically excludes tapes involved in ongoing migration and recycling.

The recycling operation requires at least two tape drives. An input tape drive is provided to mount all the tapes in the input queue. In preferred embodiments, the HSM program 4 selects from the tape inventory table 30 a tape associated with recycling or a substitute tape as the recycle output tape. In preferred embodiments, the tapes filled with the most valid data, i.e., the fullest, are selected first as recycling output, whereas the input substitute tapes are those with the least amount of valid data.

With this system, during real time operations, partially filled tapes placed in the substitute pool have their capacity utilized during migration and recycling activities by substituting in for tapes taken away for a recall operation. Such partially filled, unassociated, substitute tapes will also be used in recycle operations, thereby further increasing the capacity utilization of partially filled tapes at the recycle end. This preferred system further allows for the immediate servicing of a recall request and for the continued migration or recycling of data to the substitute tape. Moreover, using the substitution process to increase the capacity utilization of partially filled tapes during normal operations such as migration, also reduces the need to take away tape drives 10a, b, c for recycle operations in which data sets from tapes are merged into a fewer number of tapes. Reducing the need for recycling operations conserves system resources and minimizes the need to take tape drives 10a, b, c off-line for such recycling operations.

In the preferred embodiment, a tape load management policy is implemented by using the most filled substitute tape to fill-in for migration and recycling operations, and using the least filled substitute tape is used as recycling input is load controlled. On the substitute end, the most filled tapes are filled up. On the recycling end, tapes having the least amount of data are merged. This load control balancing insures that tapes at both ends of the spectrum, i.e., from the most filled to the least filled with data, will be involved in capacity utilization operations to improve data capacity. Nonetheless, those skilled in the art will appreciate that alternative load management policies may be implemented with respect to selecting substitute tapes to use in migration and recycling operations. Alternatively, if recycling is not used to balance the load control, the loading of substitute tapes during migration may be varied to provide load control balancing. For instance, a first set of substitutes based on those that are most filled with data followed by a second set of substitutes based on those least filled with data can be consecutively used to substitute in during migration, thereby balancing the load control, i.e., insuring that the capacity of all partially filled tapes, those with the least and most amounts of valid data, are utilized.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Logic to Use Substitute Storage Devices During HSM Operations

Figure 4:
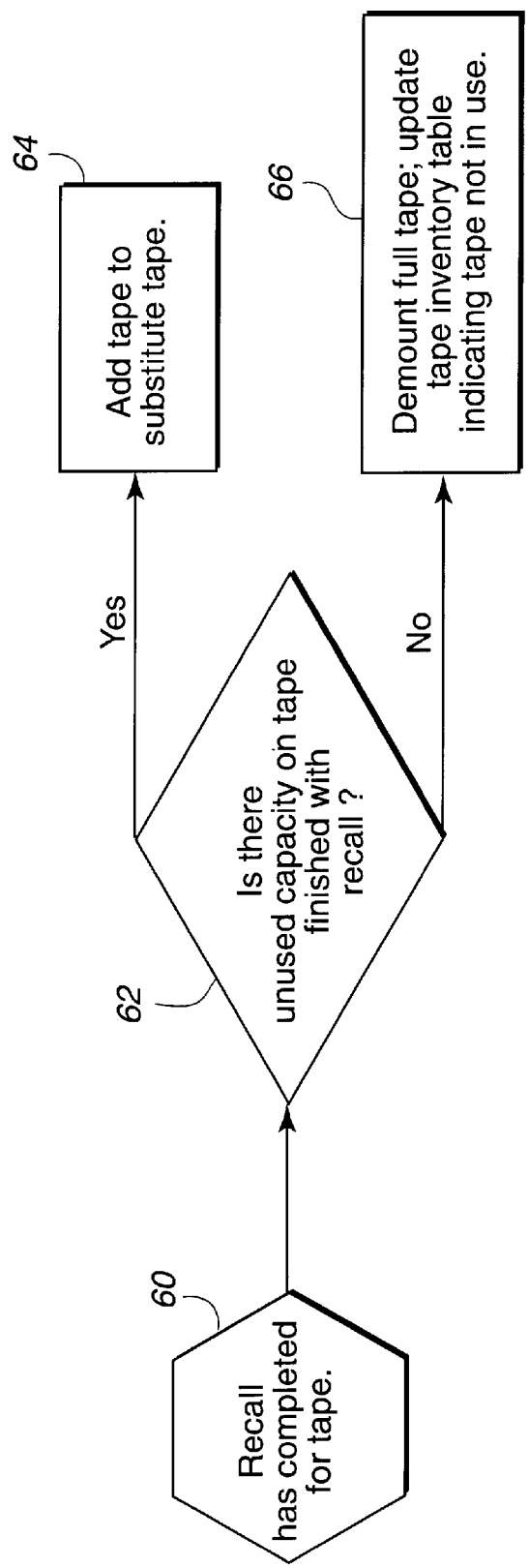
FIG. 4 illustrates a flowchart of logic that uses substitute tapes with recall operations in accordance with preferred embodiments of the present invention.
Figure 5:
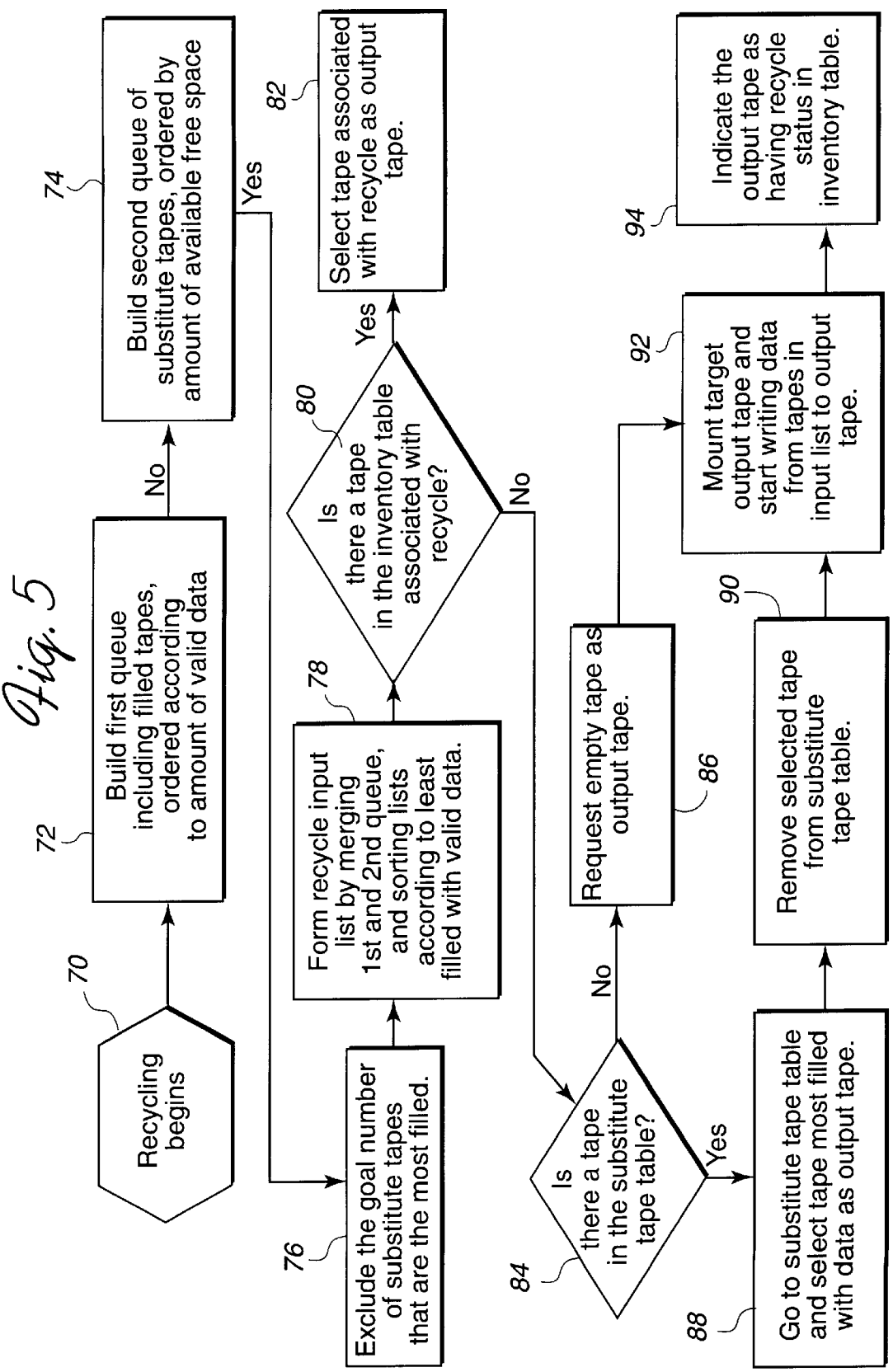
FIG. 5 illustrates a flowchart of logic that uses substitute tapes with recycling operations in accordance with preferred embodiments of the present invention.

FIGS. 3, 4, and 5 are flowcharts illustrating logic included in the HSM program 4 that implements the substitution capabilities of the preferred embodiments within migration, recall, and recycling operations, respectively. In preferred embodiments, the HSM program 4 is a multi-tasking program and the operating system of the host system 2 supports multi-tasking. In such case, the HSM program 4 may simultaneously execute threads implementing the logic of FIGS. 3, 4, 5. Once the HSM program 4 has completed executing the logic of FIGS. 3, 4, 5, the HSM program 4 would continue executing other threads concurrently being executed and begin executing further threads. Those skilled in the art will recognize that this logic is provided for illustrative purposes only and that different logic may be used to accomplish the same results. Moreover, the logic order shown in FIGS. 3, 4, 5 may be performed in an order other than shown in the figures.

Control begins at block 40 when during a migration operation, a complete data set has migrated to the tape cartridge, e.g., tape cartridge 12b. Control transfers to block 42 which represents the HSM program 4 determining whether a recall request, executed in another thread, was made needing the tape cartridge 12b during the migration of the completed data set. If so, control transfers to block 44; otherwise, control transfers to block 46. Block 46 represents the HSM program 4 migrating the next data set included in the migration operation to the tape cartridge 12b. If there are further data sets in the migration operation to transfer, the HSM program 4 would again execute the logic of FIG. 3, starting at block 40. Block 44 represents the HSM program 4 suspending the migration of further data sets to the tape 12b. Control transfers to block 48 which represents the state where tape 12b is available to support recall. At this time, the HSM program 4 may update the tape inventory table 30 indicating that the status of tape 12b is now recall. The HSM program 4 may then execute a recall thread to start recalling the requested data set from the tape 12b.

Control transfers to block 50 which represents the HSM program 4 determining whether there are any tapes in the substitute tape table 32. If so, control transfers to block 52; otherwise, control transfers to block 54. If the substitute tape table 32 is empty, control proceeds to block 54 to request an empty tape to use to complete the migration process. If the substitute tape table 32 is not empty, then at block 52, the HSM program 4 selects the substitute tape having the least amount of unused storage space, i.e., the fullest. Control then proceeds to block 58 which represents the HSM program 4 removing the selected tape from the substitute tape table 32. Control then proceeds to block 56 to start migrating data sets to the selected substitute tape 12d or the requested empty tape. At block 56, the HSM program may further indicate in the tape inventory table 32 that the selected tape is involved in migration.

In preferred embodiments involving an Automated Tape Library (ATL), the HSM program 4 will cause the tape subsystem 6 to mount the selected tape into a tape drive 10a, b, c. In this embodiment, substitute tapes are not mounted and must be mounted before data sets can be migrated. However, those skilled in the art will appreciate that if there are a sufficient number of tape drives or unused tape drives, then some substitute tapes may remain mounted in tape drives. In such system, there would be no need to mount the tape once selected.

FIG. 4 illustrates preferred logic executed by the HSM program 4 upon completion of a recall when substitute tapes are involved. At block 60, the logic is executed when a recall has completed with respect to a tape. Control proceeds to block 62 which represents the HSM program 4 determining whether the tape released from the completed recall process has unused capacity. A flag bit may indicate that a tape has no unused capacity and is full. If there is unused capacity, i.e., the tape is not full, then control transfers to block 64 which represents the HSM program 4 adding the released tape to the substitute table 32. At this point, the tape subsystem 6 may demount or dismount the released tape cartridge. If there is no unused data capacity, then at block 66, the HSM program 4 may cause the tape subsystem 6 to dismount or dismount the full tape and update the tape inventory table 32 to indicate that the tape is not in use. The full tape may be filled with valid as well as invalid data sets.

FIG. 5 illustrates preferred recycle logic when substitute tapes are involved in the recycle operation. Control begins at block 70 when the HSM program 4 initiates recycling operations. The HSM program 4 may initiate recycling operations at predetermined intervals, e.g., the end of the day. Control proceeds to block 72 which represents the HSM program 4 processing the data in the tape inventory table 30 to build a first queue data structure including filled tapes. In preferred embodiments, the HSM program 4 orders the filled tapes according to the amount of valid data, those with the least amount of valid data at the top of the queue. As mentioned, filled tapes can include valid as well as invalidated data, i.e., migrated data that has expired over time. In alternative embodiments, the HSM program 4 may order the filled tapes according to alternative schemes. Control transfers to block 74 which represents the HSM program 4 processing the information in the tape inventory table 30 to build a second queue data structure comprised of the unassociated partially filled tapes. Unassociated, partially filled tapes are substitute tapes.

The HSM program 4 orders the second queue of substitute tapes by the amount of data stored in the substitute tapes, placing the least filled tapes at the front of the queue. Control then proceeds to block 76 which represents the HSM program 4 excluding from the second queue the goal number of substitute tapes most filled with data, i.e., the least amount of available storage space. For instance, if the HSM program 4 maintains a goal of ten substitute tapes, then the HSM program 4 would exclude from the second queue data structure the ten most filled substitute tapes. This step consolidates the set of substitute tapes to no less than the preset goal number. Control then transfers to block 78 which represents the HSM program 4 forming a recycle input list by merging the tapes listed in the first and second queues and sorting the list according to those least filled with valid data. The tapes in the input list least filled with data are at the beginning of the input list and first selected as input for recycling operations.

Control transfers to block 80 which is a decision block representing the HSM program 4 determining whether there is a tape in the tape inventory table 30 associated with recycling operations. If so, control transfers to block 82, which represents the HSM program 4 selecting the recycle associated tape, e.g., tape cartridge 12e, as the recycle output tape. If there are no tapes associated with recycle, then control transfers to block 84 which represents the HSM program 4 determining whether there are any tapes in the tape substitute table 32. If there are no substitute tapes, then control transfers to block 86 which represents the HSM program 4 requesting an empty tape cartridge as the recycle output tape. If there are substitute tapes, then control transfers to block 88 which represents the HSM program 4 processing the information in the tape substitute table 32 to select the substitute tape most filled with data as the recycle output tape.

From block 88, control transfers to block 90 which represents the HSM program 4 removing the selected substitute tape from the tape substitute table 32. Once a tape is selected or requested at blocks 82, 86, and 90, control proceeds to block 92 which represents the HSM program 4 mounting the selected or requested recycle output tape and writing the data sets from the tapes listed in the input list to the mounted output tape. Control transfers to block 94 which represents the HSM program 4 indicating in the tape inventory table 30 that the output tape is associated with recycling operations.

In preferred embodiments, the selected target/output tape will be mounted in one tape drive, and another tape drive will be dedicated for the input tapes. Tapes will be selected from the input list in order and mounted in the input tape drive. Once all the data sets are copied from an input tape to the output tape, the input tape is demounted, and the next input tape in the input list is mounted into the input tape drive. In alternative embodiments, different combinations of tape drives may be used in the recycling operations. For instance, multiple input tapes may be mounted to provide continuous recycling of tapes from the input list in order to avoid the downtime resulting from dismounting and mounting input tapes from a single input drive.

If a tape involved in recycling operations is subject to a recall request, then the HSM program 4 will record such a request. After a data set has been transferred to the output recycle tape during recycling operations, the HSM program 4 may execute the logic of FIG. 3 beginning at block 42 to take away the tape involved in recycling to recall, and provide a substitute tape on which to complete transferring the data sets from the tapes from the recycle input list. In this way, the logic of FIGS. 3, 4, 5 insures that the capacity of partially filled tapes is utilized during normal HSM operations such as migration and recycle.

In embodiments where there are multiple tape subsystems 6, i.e., ATL libraries, the tape inventory table 30 provides information on all tapes throughout all the ATL libraries, including information location. The HSM program, 4 is capable of controlling all attached ATL tape libraries. A multiple library system with pass-through capability allows a tape to be mechanically passed from one library to another. This allows the multiple libraries to function as one single library with the combined tape drives and cartridges of all libraries managed as a single unit.

In certain multiple tape library embodiments, pass-through capability may not be feasible given the substantial time required to mechanically pass tapes between libraries. In selecting a substitute tape in ATL environments lacking pass-through capabilities, the HSM program 4 will have to determine whether the selected substitute tape is located in the same library as the tape drive allocated to the task for which the substitute is needed, i.e., the migration or recycle operation. For instance, at block 52 in FIG. 3, after selecting a substitute, the HSM program 4 would determine whether the selected substitute tape is located in the library including the tape drive allocated to the migration or recycling task for which the substitute tape is selected. If so, the selected substitute tape is used to complete the migration or recycle task interrupted by the recall. However, if the selected substitute tape is in a different library from the library including the tape drive allocated to the migration or recycling operation requiring the substitute tape, then the HSM program 4 selects the next substitute tape from the tape substitute list 32 that is most filled with data. In preferred embodiments, the selected substitute tape located in a library not including the allocated tape drive is added back to the substitute tape table 32. Alternatively, the substitute tape is not removed from the substitute tape table 32 unless it is used in a substitute operation. This determination and selection continues until the HSM program 4 locates a substitute tape that resides in the library also including the allocated tape drive.

In multi-library environments including pass through capabilities, if the HSM program 4 selects a substitute tape that is in a library not including the allocated tape drive, then the HSM program 4 can cause the tape subsystem 6 including the selected substitute tape, and all intermediary libraries, to mechanically pass the selected tape to the library including the allocated tape drive.

Conclusion

This concludes the description of the preferred embodiments of the invention. The following describes some alternative embodiments for accomplishing the present invention.

Preferred embodiments were described with respect to magnetic tapes. However, the discussed preferred embodiments could be used in the management of any type of non-volatile storage unit providing backup capacity for low activity data, e.g., optical disks, holographic units, DVD, CD-ROM, non-volatile RAM, etc.

In preferred embodiments, the control logic of FIGS. 3, 4, 5 was implemented in the HSM program 4 maintained in the host system 2. The host system 2 generates commands to cause the tape subsystem 6 to perform the desired input/output operation with respect to tape cartridges 12a, b, c, d managed by the tape subsystem 6. However, those skilled in the art will appreciate that some portions of the logic described with respect to FIGS. 3, 4, 5 could be implemented in locations other than the host system 2, such as within the tape subsystem 6. Moreover, the operations and components described with respect to the host system 2, tape subsystem 6, and HSM program 4 may be implemented in a single computer machine or distributed across a plurality of computer machines.

In the preferred logic of FIGS. 3, 4, 5, substitute tapes were not mounted. In an automated tape library (ATL), the HSM program 4 could control a robotic arm to access and mount tape cartridges from the tape library. Alternatively, in a manual mounting system, the HSM program 4 could alert the user with a message to dismount a tape and mount a specific tape from the tape library in place of the removed tape. The HSM program 4 would maintain a tape library table including information on all tapes within the tape library and their current capacity.

In summary, preferred embodiments in accordance with the present invention provide a system for increasing capacity utilization of non-volatile storage devices within a group of non-volatile storage devices used to store data from at least one attached system. A group of data sets is written to a first storage device as part of a write operation. A plurality of storage devices partially filled with data are designated as substitutes. The write operation to the first storage device is suspended upon receiving a request to read a data set stored in the first storage device. A second storage device is then selected from the plurality of substitute storage devices. The write operation is continued by writing data sets from the group of data sets included in the write operation, but were not written to the first storage device, to the selected second storage device. The requested data is then read from the first storage device.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for increasing capacity utilization of non-volatile storage devices within a group of non-volatile storage devices used to store data from at least one attached system, comprising the steps of:
   (a) writing a group of data sets to a first storage device as part of a write operation;
   (b) designating a plurality of storage devices partially filled with data as substitute storage devices;
   (c) receiving a request to read a data set stored in the first storage device while the write operation is continuing; and
   (d) after receiving the read request directed toward the first storage device, performing the steps of:
      (i) suspending the write operation to the first storage device;
      (ii) selecting a second storage device from the plurality of substitute storage devices;
      (iii) continuing the write operation by writing data sets from the group of data sets included in the write operation that were not written to the first storage device to the selected second storage device; and
      (iv) reading the requested data set from the first storage device.

2. The method of claim 1, further comprising the steps of:
   designating the first storage device a substitute storage device after reading the requested data from the first storage device;
   writing an additional group of data sets to a third storage device as part of an additional write operation;
   receiving an additional request to read a data set stored in the third storage device; and
   after receiving the additional read request, performing the steps of:
      (i) suspending the additional write operation to the third storage device;
      (ii) selecting the first storage device from the plurality of substitute storage devices;
      (iii) continuing the write operation by writing data sets from the additional group of data sets included in the additional write operation that were not written to the third storage device to the selected first storage device; and
      (iv) reading the requested data set from the third storage device as part of the additional read request.

3. The method of claim 1, wherein the step of selecting a second storage device further comprises the steps of:
   locating a substitute storage device among the plurality of substitute storage devices that has a least amount of unused data storage space; and
   selecting the located substitute storage device.

4. The method of claim 1, further comprising the steps of:
   selecting a group of substitute storage devices as input to a recycling operation; and
   transferring data sets from the group of substitute storage devices to at least one storage device designated as an output storage devices to the recycling operation.

5. The method of claim 4, wherein the step of selecting a group of substitute storage devices comprises the steps of:
   selecting a goal value of substitute storage devices; and
   excluding from the group of substitute storage devices a number of substitute storage devices equal to the goal value, wherein the excluded substitute storage devices include a least amount of unused storage space among all substitute storage devices.

6. The method of claim 4, wherein the output storage device is a substitute storage devices not included in the group of substitute storage device.

7. The method of claim 1, wherein a plurality of storage libraries each include a plurality of storage devices, wherein a storage drive in one of the libraries is allocated to the write operation, wherein the step of selecting a second storage device from the plurality of substitute storage devices comprises the steps of:
   selecting a second storage device from the plurality of substitute storage devices;
   determining whether the selected second storage device is located in the storage library including the allocated storage drive; and
   selecting another substitute storage device as the second storage device upon determining that the selected second storage device is not located in the storage library including the allocated storage drive.

8. A storage management system for increasing capacity utilization, comprising:
   (a) a storage subsystem;
   (b) a plurality of storage devices, including a plurality of storage devices designated as substitutes, wherein the storage subsystem manages the storage devices;
   (c) a host system connected to the storage subsystem and in data communication with the storage devices; and
   (d) program means for:
      (i) controlling a write operation in which a group of data sets are written from the host system to a first storage device;
      (ii) processing a request to read a data set stored in the first storage device while the write operation is continuing;
      (iii) suspending the write operation to the first storage device after processing the read request;
      (iv) selecting a second storage device from the plurality of substitute storage devices after suspending the write operation;
      (v) continuing the write operation by writing data sets from the group of data sets included in the write operation that were not written to the first storage device to the selected second storage device; and
      (vi) reading the requested data set from the first storage device.

9. The system of claim 8, wherein the program means is further capable of designating the first storage device as a substitute storage device after the host system has read data from the first storage device.

10. The system of claim 8 wherein each storage device includes a storage medium that is a member of the set of media comprising magnetic tape, optical disks, Compact Disc-Read-Only-Memory (CD-ROM), holographic storage units, and non-volatile random access memory.

11. The system of claim 8, wherein the storage management system including:
   a plurality of storage subsystems, wherein each storage subsystem includes a plurality of storage devices and at least one storage drive into which one storage device is capable of being inserted in order to perform read/write operations with respect to the storage device, and
   an allocated storage drive included in one of the storage subsystems allocated to the write operation, and wherein the program means is further capable of determining whether a selected substitute storage device is located in the storage subsystem including one allocated storage drive and selecting another substitute storage device as the substitute storage device upon determining that the selected storage device is not located in the storage subsystem including the allocated storage drive.

12. An article of manufacture for use in programming a computer system to control a plurality of non-volatile storage devices that store data, wherein the computer system is in data communication with the storage devices, the article of manufacture comprising a computer readable storage device including a computer program embedded therein that causes the computer system to perform the steps of:
   (a) causing the writing of a group of data sets to a first storage device as part of a write operation;
   (b) designating a plurality of storage devices partially filled with data as substitute storage devices;
   (c) processing a request to read a data set stored in the first storage device while the write operation is continuing; and
   (d) after processing the read request directed toward the first storage device, performing the steps of:
      (i) suspending the write operation to the first storage device;
      (ii) selecting a second storage device from the plurality of substitute storage devices;
      (iii) continuing the write operation by causing the writing of data sets from the group of data sets included in the write operation that were not written to the first storage device to the selected second storage device; and
      (iv) reading the requested data set from the first storage device.

13. The article of manufacture of claim 12, wherein the computer program included in the computer readable storage device further causes the computer system to perform the steps of:
   designating the first storage device a substitute storage device after the requested data has been read from the first storage device;
   causing the writing of an additional group of data sets to a third storage device as part of an additional write operation;
   processing an additional request to read a data set stored in the third storage device; and
   after processing the additional read request, performing the steps of:
      (i) suspending the additional write operation to the third storage device;
      (ii) selecting the first storage device from the plurality of substitute storage devices;
      (iii) continuing the write operation by causing the writing of data sets from the additional group of data sets included in the additional write operation that were not written to the third storage device to the selected first storage device; and
      (iv) reading the data set from the third storage device as part of the additional read request.

14. The article of manufacture of claim 12, wherein when the computer program causes the computer system to perform the step of selecting a second storage device, the computer program causes the computer system to perform the steps of:
   locating a substitute storage device among the plurality of substitute storage devices that has a least amount unused storage space; and
   selecting the located substitute storage device.

15. The article of manufacture of claim 12, wherein the computer program included in the computer readable storage device further causes the computer system to perform the steps of:
   selecting a group of substitute storage devices as input to a recycling operation; and
   transferring data sets from the group of substitute storage devices to at least one storage device designated as an output storage device to the recycling operation.

16. The article of manufacture of claim 15, wherein when the computer program causes the computer system to perform the step of selecting a group of substitute storage devices, the computer program causes the computer system to perform the steps of:
   selecting a goal value of substitute storage devices; and
   excluding from the group of substitute storage devices a number of substitute storage devices equal to the goal value, wherein the excluded substitute storage devices include a least amount of unused storage space among all substitute storage devices.

17. The article of manufacture of claim 15, wherein the output storage device is a substitute storage device not included in the group of substitute storage devices.

18. The article of manufacture of claim 12, wherein a plurality of storage libraries each include a plurality of storage devices, wherein a storage drive in one of the libraries is allocated to the write operation, wherein when the computer program causes the computer system to perform the step of selecting a second storage device from the plurality of substitute storage devices, the computer program causes the computer system to perform the steps of:

selecting a second storage device from the plurality of substitute storage devices;

determining whether the selected second storage device is located in the storage library including the allocated storage drive; and selecting another substitute storage device as the second storage device upon determining that the selected second storage device is not located in the storage library including the allocated storage drive.

19. A computer readable storage medium for storing data accessible by at least one storage management program being executed on a computer system, wherein the computer system is capable of controlling a plurality of non-volatile storage devices, comprising:

a data structure stored in the computer readable storage medium, the data structure including information used by the storage management program and including:
  (i) a plurality of data objects, wherein each data object identifies a storage device;
  (ii) status information for each data object, wherein at least one data object includes status information identifying the storage device represented by the data object as a substitute storage device, wherein the storage management program processes the data objects and status information therein to select a second storage device from substitute storage devices after processing a read request directed toward a first storage device while a group of data sets are being written to a first storage device as part of a write operation, and wherein the storage management program suspends writing of the group of data sets to the first storage device and continues the write operation by directing the group of data sets not written to the first storage device to the selected second storage device; and
  (iii) location information for each data object, wherein the storage management program processes the location information to determine the location of the selected second storage device represented by the data object.

20. The computer readable storage medium of claim 19, wherein after the requested data is read from the first storage device, the status information of the data object representing the first storage device is modified to indicate that the first storage device is a substitute storage device, and wherein the storage management program is capable of selecting the first storage device from the substitute storage devices to complete writing a group of data sets included in a suspended write operation.

21. The computer readable storage medium of claim 19, wherein the data structure further comprises capacity utilization information for each data object indicating the amount of unused data storage space on the storage device represented by the data object, wherein the storage management program processes the capacity utilization information of each substitute storage device to select the substitute storage device having a least amount of unused data storage space.

22. The computer readable storage medium of claim 21, wherein the location information in the data structure indicates a library from a plurality of libraries in which the storage device represented by a data object is located, wherein a storage drive is allocated to the write operation, and wherein the step of locating a substitute storage device comprises the step of the storage management program processing data in the data structure to locate a substitute storage device that satisfies a predefined criteria and that is located in a library including the allocated storage drive.

23. The computer readable storage medium of claim 22, wherein the predefined criteria is the substitute storage device having a least amount of unused data storage space, wherein the at least one storage management program processes the capacity utilization information and the location information in the data structure to locate the substitute storage device that has the least amount of unused data storage space and that is located in a library including the allocated storage drive.

* * * * *

UNITED STATES PATENT AND TRADEMARK OFFICE
CERTIFICATE OF CORRECTION

PATENT NO.    : 6,199,146 B1
DATED         : March 6, 2001
INVENTOR(S)   : Jerry Wayne Pence It is certified that error appears in the above-identified patent and that said Letters Patent is hereby corrected as shown below:

Column 4,
Line 30, replace "if" with -- of --;

Column 6,
Line 67, delete "is used";

Column 8,
Line 47, replace the first occurrence of "dismount" with -- demount --.

Signed and Sealed this

Eighteenth Day of June, 2002

*Attest:*

*Attesting Officer*

JAMES E. ROGAN
*Director of the United States Patent and Trademark Office*